United States Patent [19]
Earley, Jr.

[11] Patent Number: 6,083,146
[45] Date of Patent: Jul. 4, 2000

[54] TOOL STORAGE POCKET FOR HOLLOW TOOL SHANK

[75] Inventor: Marvin G. Earley, Jr., Blanchester, Ohio

[73] Assignee: Unova IP Corporation, Woodland Hills, Calif.

[21] Appl. No.: 09/149,491

[22] Filed: Sep. 8, 1998

[51] Int. Cl.[7] .......................... B23Q 3/155; B23B 29/00
[52] U.S. Cl. .......................... 483/59; 82/161; 279/79; 409/234; 483/65
[58] Field of Search .................. 483/62, 60, 59, 483/58, 65; 82/158, 161, 160; 279/79, 80, 76; 211/1.51; 409/234, 232; 408/238 A, 239 R, 124; 433/177

[56] References Cited

U.S. PATENT DOCUMENTS

| | | | |
|---|---|---|---|
| D. 348,274 | 6/1994 | Hallbach | D15/140 |
| 1,475,136 | 11/1923 | Olson | 279/79 |
| 2,336,095 | 12/1943 | Heding | 279/79 |
| 2,890,072 | 6/1959 | Kaman et al. | 279/79 |
| 2,916,787 | 12/1959 | Samiran | 279/79 |
| 3,492,717 | 2/1970 | Seidel et al. | 29/568 |
| 3,832,076 | 8/1974 | Gehrke | 403/359 |
| 4,136,982 | 1/1979 | Sagady | 403/108 |
| 4,403,960 | 9/1983 | Hauri et al. | 433/177 |
| 4,502,821 | 3/1985 | Wagner | 408/124 |
| 4,509,887 | 4/1985 | Hofling | 408/239 R |
| 5,062,822 | 11/1991 | Nakayama et al. | 475/200 |
| 5,499,884 | 3/1996 | Kuhnhold et al. | 403/359 |

FOREIGN PATENT DOCUMENTS

| | | |
|---|---|---|
| 310942 | 4/1989 | European Pat. Off. . |
| 819929 | 1/1996 | Japan . |

*Primary Examiner*—William Briggs
*Attorney, Agent, or Firm*—Thomas M. Farrell

[57] ABSTRACT

A plastic tool pocket mounts to tool storage chain in a machining center. The tools all have a hollow, tapered tool shank, which fits into tool pocket. The hollow tool shank has an internal relief and retention groove for securing the tool shank with a machine spindle. The tool pocket has central support shaft, having a circular spring ring loosely fitted into an annular clearance groove. When the tool shank slides over the support shaft, the circular ring first deflects radially into the clearance groove, then pops out into the retention groove, to hold the tool shank in position.

13 Claims, 5 Drawing Sheets

TOOL STORAGE POCKET FOR HOLLOW TOOL SHANK

BACKGROUND OF THE INVENTION

This invention relates to a storage device for supporting hollow shank tools, especially in a machine tool.

One form of tool holder used for mating a variety of tools to a common machine tool spindle, has a hollow shank that includes an outer locating surface of circular cross section (often tapered), adapted for seating in a complementary mating socket of the machine tool spindle.

A straight hollow shank toolholder is shown in European patent 310942A, of Hertel Werkzeuge AG, dated Aug. 10, 1987. This toolholder is shown within a machine spindle, where radially movable gripping elements comprise a plurality of balls, situated adjacent a ramp portion of an axially movable drawbar, inside the tool shank; the balls, in turn, force arcuate segments outwardly, to securely hold the tool.

A tapered hollow shank toolholder is exemplified by the "HSK toolholder". HSK is a special form, corresponding to a "DIN" (German engineering standard), for short, hollow, tapered tool shanks, wherein a tool shank is mounted to a spindle on both its conical surface, and the adjacent face formed on its integral toolchanger gripping flange. The taper is manufactured to very close tolerances, for accurate positioning at the spindle taper gage line. Unlike well-known ANSI (American National Standards Institute) standard solid toolholders, which are pulled into a spindle seat by way of a retention stud extending from the shank, an HSK tool shank has an internal relief, or retaining groove, so that, once inside a machine spindle, internal gripping fingers of the spindle assembly direct outward and rearward forces against the tool shank, to retain it securely with the spindle. An axial retention force of about 10,000 lbs is typically applied by a belleville spring stack, and overcome by a powered unit such as a hydraulic cylinder. This internal gripping arrangement is especially desirable for use in high speed applications, where centrifugal forces will work in the same direction as clamping forces applied to the tool shank. HSK tool shanks are manufactured in several forms, including both a keyless, frictionally driven style, and a positively driven style, having drive keyways at the small end of the taper.

Low-force analogues of spindle gripping arrangements have been proposed for retaining hollow shank tools within tool storage pockets; one example comprises a lightly loaded ball retention system, wherein balls are spring loaded against the tool retention groove. Such a tool storage pocket is shown in Japanese patent No. 8019929, dated Jan. 23, 1996, of Mori Machinery KK. In this case, a spring loaded conic member cams against several balls which are forced radially outward into the retention groove of a hollow tool shank; a separate device overcomes the spring force. Another example of a ball retention mechanism utilized in a tool storage device for supporting hollow shank tools is shown in U.S. Pat. No. 3,492,717, of Seidel et al, dated Feb. 3, 1970. At FIG. 2 of that patent, the tool shank is shown supported in a tool storage socket, and the end of each tool is provided with a bore having an inwardly-directed flange. A slidably mounted spool member has a double-cone groove which is spring-biased against a stop in the socket. The groove cams against a detent ball, and pushes it laterally behind the flange to hold the tool securely in the socket. A separate, movable arm contacts the spool member and pushes on it, to overcome the spring, so that the ball is free to move radially inwardly and release the tool.

In the prior art ball detent storage devices mentioned, an external actuating means must be employed to release the tool from its tool storage receptacle. In certain instances, the actuating means will take up an appreciable amount of space, typically along an axial direction, in order to accomplish the release of the balls.

The present invention obviates certain difficulties inherent in applying prior art ball detent devices, by utilizing a compact ring detent for holding tools within a tool storage module, which avoids the single point wear condition commonly associated with ball clamps.

SUMMARY OF THE INVENTION

It is therefore, an object of the present invention to provide for a compact tool storage module for supporting and retaining hollow shank toolholders.

Another object of the present invention is to provide for a tool storage module for hollow shank toolholders which makes use of retention elements avoiding the single point wear condition inherent in ball detent devices.

The invention is shown embodied in an improved tool storage module for tools having a hollow tool shank, wherein the tool shank includes: a longitudinal shank axis; an end opening in a free shank end, of predetermined cross-sectional shape and dimension, forming a cavity within the tool shank; and a retention groove formed within the tool shank cavity, the retention groove being larger than the end opening and axially spaced from the free shank end; the improvement comprising a storage module base, including a shaft having a free shaft end and a longitudinal shaft axis, the shaft having an outer surface of predetermined cross-sectional shape and size to fit through the end opening in the tool shank; an annular clearance groove formed around the shaft, axially spaced from the free shaft end; a radially-compressible spring ring located within the clearance groove, the spring ring having an outer peripheral surface which, when relatively uncompressed, is of greater size than the outer surface of the shaft and sized to be received into the retention groove; and the shaft being closely fitted to the opening such that the tool shank may be slidably received in assembly with the shaft, through relative movement of the shank and shaft along the axes, whereby as the shank and shaft are relatively moved into assembly together, the shank is forced over the spring ring, the spring ring may compress into the clearance groove, and expand into the retention groove.

In one aspect of the invention, the shaft supports the tool shank at axially spaced portions of the tool shank cavity, when the tool shank is slidably received in assembly with the shaft.

In another aspect of the invention, the storage module base includes a shroud portion substantially covering the outer shank surface when the shank is received in assembly with the shaft.

DESCRIPTITON OF THE INVENTION

It should be noted that this description contains certain attitudinal references such as "right", "left", "front", "rear", etc.; such attitudinal references are made for the convenience of the reader in following the drawings, and do not constitute a limitation on the invention, which may be utilized in a variety of spatial orientations.

Figure 1:
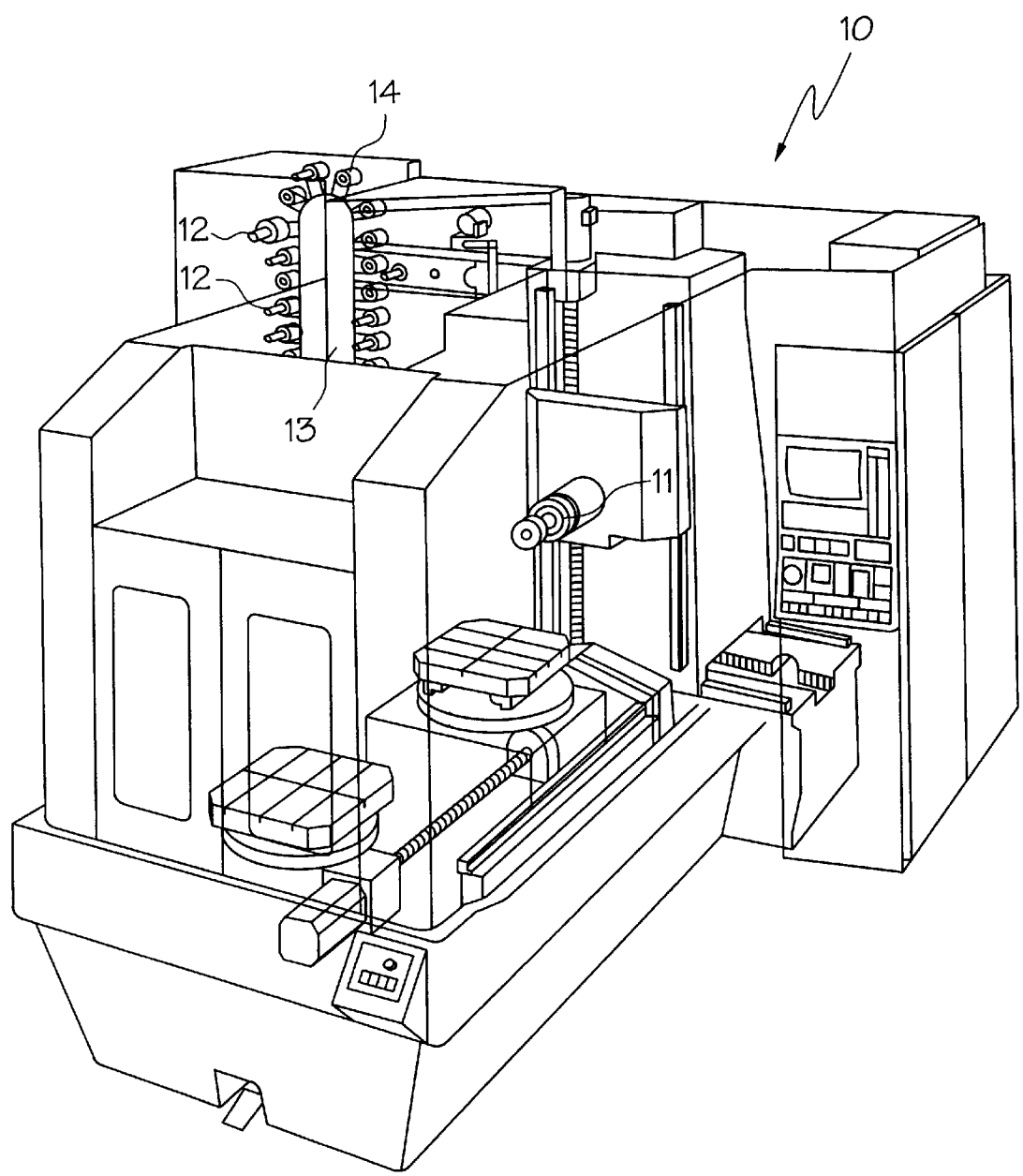
FIG. 1 is a perspective view of a machining center, having a tool storage matrix made up of a plurality of tool storage modules.

Referring now to the drawings and, in particular, to FIG. 1 thereof, the perspective view shows a machine 10 such as the MAXIM 500 machining center, available from Cincinnati Milacron Inc, assignee of the present invention. The machine 10 has a tool spindle 11 for supporting and driving a variety of tools 12. The machine 10 also has a tool storage matrix comprising a movable chain 13, along which are positioned a plurality of tool storage modules or tool pockets 14, especially adapted for supporting a hollow shank toolholder, such as an HSK toolholder, well-known in the machine tool industry.

Figure 2:
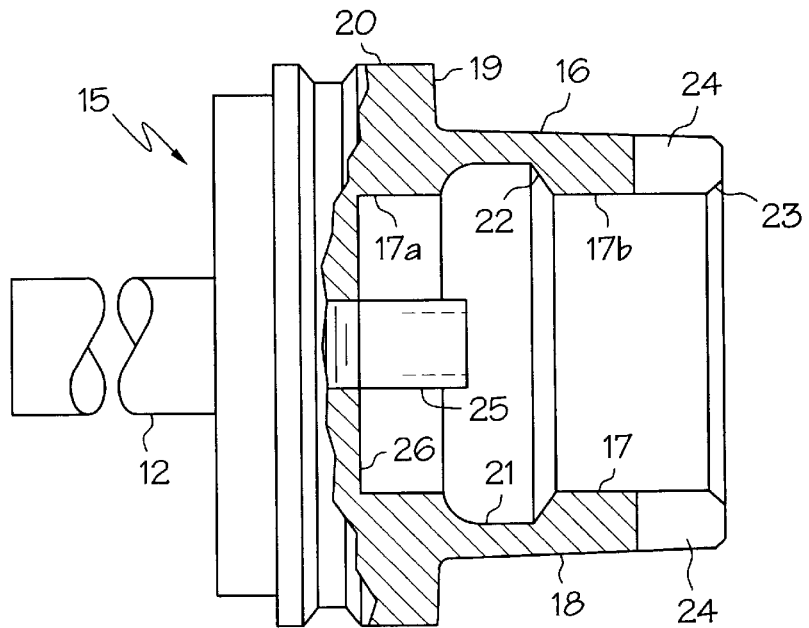
FIG. 2 is a side view, in partial section, of a hollow shank toolholder.

FIG. 2 depicts a female tool member, comprising an HSK hollow shank toolholder 15. The tool shank 16 has a central aperture, or blind bore 17, in one end, and supports a tool 12 at the other end. The tool shank 16 is mountable to a spindle 11 (FIG. 1) on both its conical outer taper 18, and the face 19 of its adjacent flange 20. The HSK tool shank 16 has an internal relief, or annular retaining groove 21 within the bore 17, which, in effect, forms spaced bore portions 17a,b, and the retaining groove 21 has an internal conical face, or first ramp 22, at the right end of the groove. The bore 17 also has an outwardly-facing end chamfer, comprising a second ramp 23; the ramps 22,23 slope in opposite directions, converging towards each other. The tool shank 16 has drive keyways 24 at the small end of the taper 18. The HSK toolholder 15 makes use of a short, central coolant tube, threaded into the end of the bore. When in fluid connection with a machine spindle 11, the tube 25 supplies coolant through the tool 12.

Figure 3:
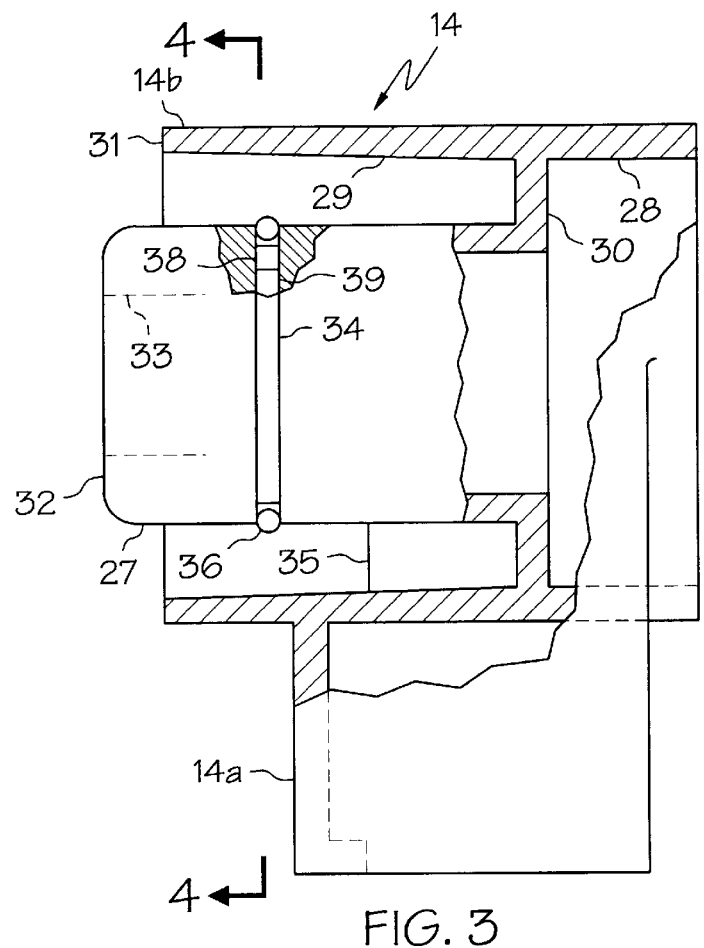
FIG. 3 is a side elevational view, in partial section, of a tool pocket for supporting the toolholder of FIG. 2.
Figure 5:
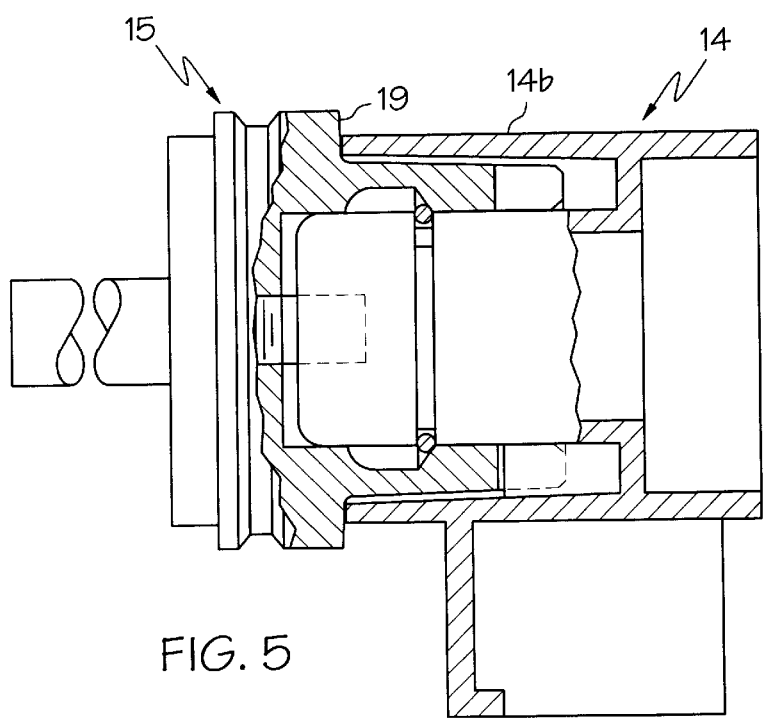
FIG. 5 is a side elevational view, in section, showing the assembly of the hollow shank toolholder of FIG. 2 with the tool pocket of FIG. 3.

FIG. 3 shows a male storage member, comprising a tool pocket 14, which has a support shaft 27, receivable in the tool shank bore 17, for permitting relative linear path movement between the tool shank 16 and tool pocket 14 in two opposite directions. The tool pocket 14 is a modified version of the tool pocket depicted in U.S. Pat. design No. 348,274, of Hallbach et al, Jun. 28, 1994, assigned to Cincinnati Milacron Inc., assignee of the present invention; the disclosure of this patent is incorporated herein by reference. The tool pocket 14 is molded of plastic, and is canister-like in appearance, having a radially extending bracket 14a portion which is affixable to a machine element, for example, a the tool storage chain 13 shown in FIG. 1. The tool pocket 14 has a rear counterbore 28 and a front tapered counterbore 29, coaxial with the shaft 27, forming a radially extending web 30 within the pocket 14. The support shaft 27 extends frontwardly, from the web 30, to a point slightly beyond the circular front face 31 of the pocket 14. (For molding purposes, the shaft 27 is a two-part assembly which will be fully discussed later, in connection with FIG. 7.) The front end 32 of the support shaft 27 is rounded-off, and has a central clearance hole 33 for accommodating the coolant tube 25 of the toolholder 15. The support shaft 27 has an annular clearance groove 34, located within the tapered counterbore 29 of the pocket 14; this annular clearance groove 34 aligns with the retaining groove 21 in the tool shank 16 when the tool shank 16 and tool pocket 14 are in a desired mating relationship, i.e., when the tool 12 is in storage (ref. FIG. 5). An integrally molded key 35 is formed between the shaft 27, web 30, and counterbore 29, the key 35 serving to engage a keyway 24 of the toolholder 15 and thereby maintain proper orientation of the toolholder 15 while in storage. It is intended that the support shaft 27 be closely-fitted to the bore 17 of the HSK toolholder 15 of FIG. 2, to provide stable support at the spaced bore portions 17a,b, so that the front end of the tool pocket 14 becomes simply a shroud portion 14b, used primarily for maintaining cleanliness of the tool shank taper 18 and its adjacent flange face 19, and for providing a stop shoulder means against which the flange 20 can rest. It will be appreciated, though, that the tapered counterbore 29 could be closely sized to support the toolholder.

Figure 4:
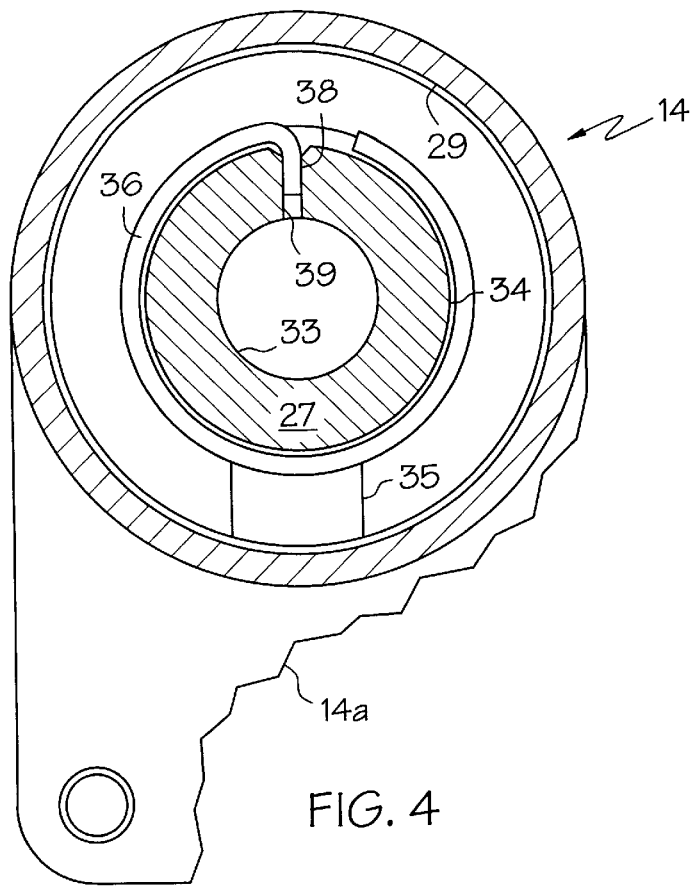
FIG. 4 is an end sectional view, taken along the line 4—4 of FIG. 5.

A radially-compressible, circular, or "round", retaining ring 36 is captively positioned within the clearance groove 34. The retaining ring 36 is formed of round, steel music wire and sized so that, in its uncompressed state, it extends radially beyond the peripheral surface of the support shaft (see FIG. 4). The purpose of the retaining ring 36 is to form a spring detent device for holding the tool shank 16 within the tool pocket 14; the detent device is overcome by applying a predetermined axial withdrawal force, when extracting the tool shank 16. When the grooves 21,34 are aligned, the ring 36 assumes an outwardly-biased, slightly preloaded retention position as shown in the assembly view of FIG. 5, in interference contact with both the shank 16 and pocket 14, i.e., contacting the first ramp 22 of the tool shank 16 and the left side 37 of the clearance groove 36; in this manner, a vector of the radial spring force will bias the flange face 19 of the tool shank 16 against the shroud portion 14b of the tool pocket 14. Thus, the ring 36 serves to resist relative movement of the shank 16 in at least one of the opposite directions (the "withdrawal direction"—towards the left of FIG. 5), independent of other means. The shroud portion 14b provides a stop shoulder means for resisting relative movement between the tool shank 16 and tool pocket 14 in the other of the opposite directions. The retaining ring 36 extends in a loop for almost one turn, and has one end formed into a hook, or tang portion 38, extending radially inwardly, and seating in a radial hole 39 formed through the support shaft 27. Thus, the retaining ring 36 may be radially compressed within its annular clearance groove 34, and will be restrained from rotationally slipping around in the groove 34. As an option, the tang portion 38 of the ring 36 could be omitted from the assembly. The clearance groove 34 in the support shaft 27 is sufficiently deep, so that the retaining ring 36 may be displaced, under a radially-compressing load, to an assembly-disassembly position, out of the linear path of the hollow tool shank 16. The second ramp 23 of the hollow tool shank 16 serves to force the retaining ring into the assembly-disassembly position on the tool pocket support shaft 27, as the shank 16 and pocket 14 are brought together, on application of a predetermined axial force urging relative movement of the shank 16 in one of the opposite directions (i.e., in the "insertion direction", towards the right of FIG. 5, with respect to the tool pocket), with the bore 17 maintaining the retaining ring 36 in the radially-compressed assembly-disassembly position until the grooves 21,34 are aligned, whereupon the retaining ring 36 pops out to reassume the retention position of FIG. 5, to retain the shank 16 and pocket 14 in assembly. The first ramp 22 also facilitates forcing the retaining ring 36 into the assembly-disassembly position, upon application of a predetermined axial withdrawal force.

Figure 6:
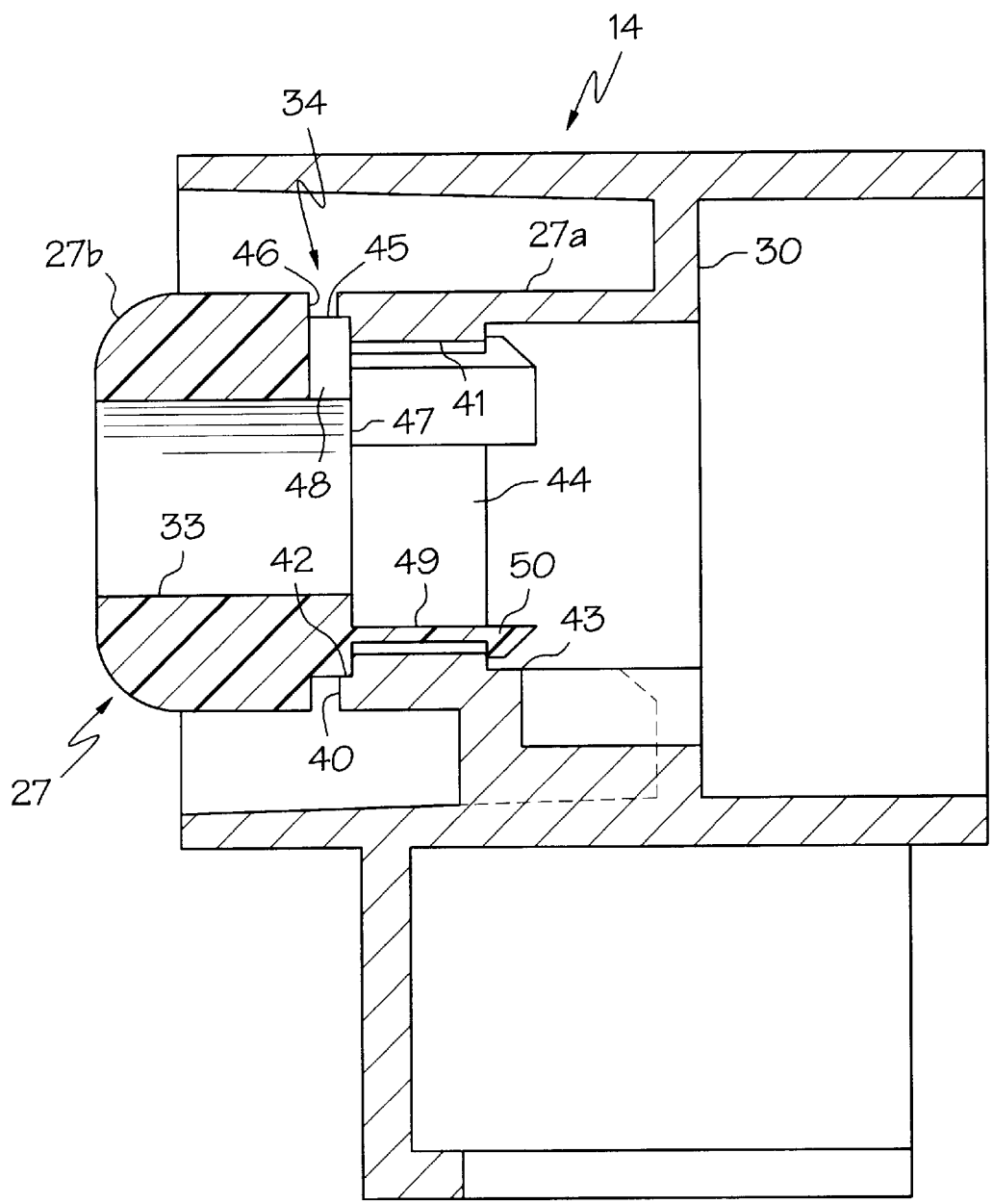
FIG. 6 is a side elevational view, in section, showing a two-part support shaft.

As briefly mentioned above in connection with FIG. 3, since it is preferred that the tool pocket 14 be a plastic molding, the support shaft 27 is formed of two parts, a base piece 27a and a nose piece 27b, to facilitate molding the annular groove 34 and radial hole 39, and to assist in assembling the unit. The base and nose pieces 27a,b are joined using a "snap-fit" technique, well-known in the plastic assembly arts. With reference to the assembly of FIG. 6, which essentially corresponds to FIG. 3, where the retaining ring 36 has been removed for clarity of illustration, the base piece 27a extends from the web 30, and has a front end face 40, central hole 41, and front and rear counterbores 42,43. The counterbores 42,43 have precise depths to form an accurate axial land 44 within the hole 41. The nose piece 25b is of the same outer diameter as the base piece 27a, and has a reduced pilot diameter 45, forming a shoulder 46. The pilot diameter 45 is sized to fit closely into the front counterbore 42 of the base piece 27a, and bottom on the inner end face 47 of the pilot diameter 45, so that, once assembled, the front end face 40 of the base piece 27a, and shoulder 46 of the nose piece 27b, cooperate to form the annular clearance groove 34 around the shaft 27. A radially extending groove 48 in the inner end face 47 also cooperates with the front end face 40 of the base piece 27a, to form the radial hole 39 for the tang portion 38 of the retaining ring 36. The inner end face 47 of the pilot diameter 45 has a plurality of deflectable cantilevered lugs 49 extending in an axial direction through the central hole 41. Each lug 49 has an outwardly directed end hook 50, spaced from the inner end face 47 by a dimension corresponding to the land 44 within the hole 41. As the lugs 49 are forced through the hole 41, the hooks 50 are deflected inwardly; once through the land 44, the hooks 50 snap outwardly to captivate the nose piece 27b with the base piece 27a. This assembly also permits the nose piece 27b to be easily replaced, and the pieces 27a,b to be made of different materials.

Figure 7:
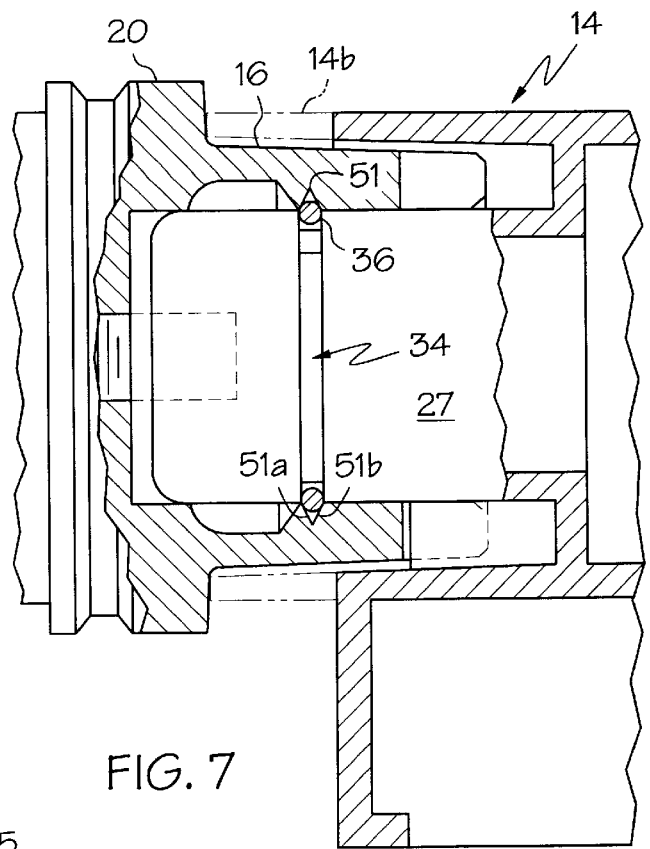
FIG. 7 is a side elevational view, in partial section, showing an alternative embodiment of the invention.

An alternative embodiment is shown in FIG. 7, in which the retaining ring 36 bears against both flanks 51a,b of a vee-shaped retention groove 51 in the tool shank 16, and not in the usual spindle retention groove 21 of the shank 16. Here, the ring 36 is operative to resist relative movement between the shank 16 and support shaft 27 in both directions, independent of other means. With this version, it is not necessary to provide a stop shoulder for the tool shank flange 20, although a properly dimensioned shroud portion 14b may still be a desirable adjunct to the design, for general protection of the shank 16.

Figure 8:
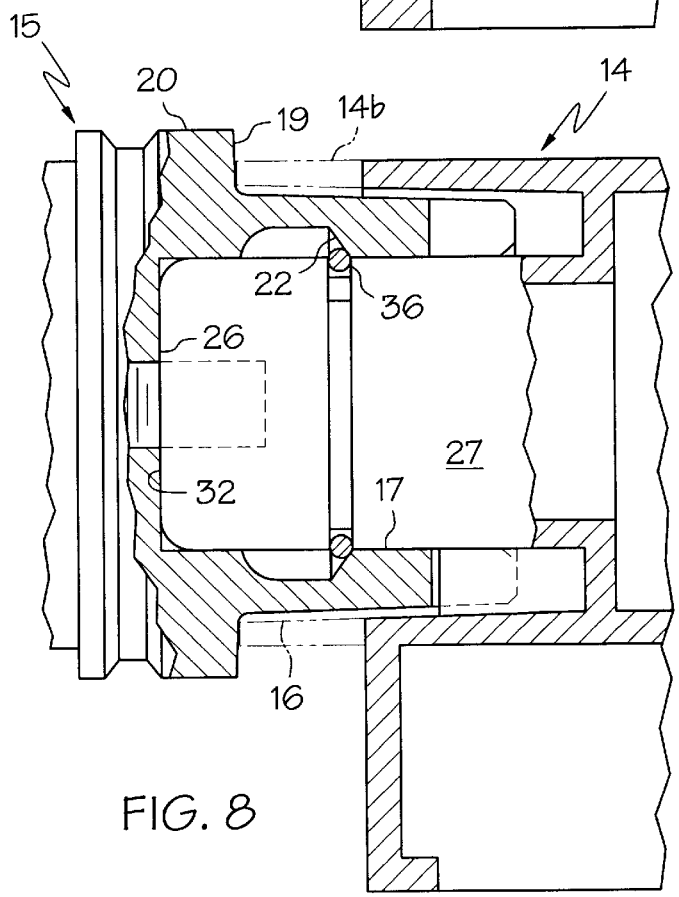
FIG. 8 is a side elevational view, in partial section, showing an alternative embodiment of the invention.

Another alternative embodiment is shown in FIG. 8, in which the retaining ring 36 bears against the first ramp 22 of the tool shank 16, and the front end 32 of the support shaft 27 bears against the end 26 of the tool shank bore 17. As with the embodiment of FIG. 7, it is not necessary to provide a stop shoulder for the tool shank flange 20, although a properly dimensioned shroud portion 14b may still be a desirable adjunct to the design, for general protection of the shank 16.

While it is intended that the tool pocket be manufactured from a durable material, such as glass filled plastic resin, the pocket may be formed of variety of engineering materials, including metals.

It is contemplated that, in some embodiments, additional means could be provided for positive centering of the retaining ring 36 with the shaft 27, e.g., an intermediate elastic support means (not shown) could be inserted beneath the ring 36 in the clearance groove 34. It is also noted that the retaining ring 36 could be formed into other shapes extending around the support shaft 27, e.g., convoluted designs (not shown), and that the ring 36 may also be formed of materials having a variety of cross-sectional shapes.

While the invention has been shown in connection with preferred and alternative embodiments, it is not intended that the invention be so limited; rather, the invention extends to all such designs and modifications as come within the scope of the appended claims.

What is claimed is:

1. In an assembly, a female tool member having an aperture, a male storage member receivable in said aperture, for permitting relative movement between said members in two opposite directions, said female tool member having an annular retaining groove in said aperture, said male storage member having an annular clearance groove that aligns with said retaining groove in said female tool member when said members are in a desired mating relationship, a round retaining ring that, when positioned in said grooves when said grooves are aligned, assumes a retention position, wherein it is in interference contact with said members at said grooves to resist relative movement between said members in at least one of said opposite directions, independent of any other means, said clearance groove in said male storage member having a depth sufficient so that said retaining ring may be displaced under load to an assembly-disassembly position within said male storage member's clearance groove, out of a path of said female tool member, said female tool member having a ramp at one end for forcing said retaining ring into said assembly-disassembly position on said male storage member, as said members are mated, on application of a predetermined force urging relative movement between said members in one of said opposite directions, with said aperture maintaining said retaining ring in said assembly-disassembly position until said grooves are aligned, whereupon said retaining ring assumes said retention position to retain said members in assembly, and said female tool member, at one side of its retaining groove, having a ramp for forcing said retaining ring into said assembly-disassembly position on said male storage member on application of a predetermined force urging relative movement between said members in other of said opposite directions, whereafter said female tool member maintains said retaining ring in said assembly-disassembly position, to permit disassembly of said members.

2. An assembly in accordance with claim 1, wherein said retaining ring, when in interference contact with said members at the grooves, is operative to resist relative movement between said members in both of said opposite directions, independent of any other means.

3. An assembly in accordance with claim 1, further comprising shoulder means for resisting relative movement between said members in other of said opposite directions.

4. An assembly in accordance with claim 2, further comprising shroud means affixed to said male storage member for covering an outer surface of said female tool member.

5. An assembly in accordance with claim 3, further comprising shroud means affixed to said male storage member for covering an outer surface of said female tool member.

6. An improved tool storage module for tools having a common hollow tool shank, wherein said tool shank includes: a longitudinal shank axis; an end opening in a free shank end, of predetermined cross-sectional shape and dimension, forming a cavity within said tool shank; and, a retention groove formed within said tool shank cavity, said retention groove being larger than said end opening and axially spaced from said free shank end; the improvement comprising:

a storage module base, including a shaft having a free shaft end and a longitudinal shaft axis, said shaft having an outer surface of predetermined cross-sectional shape and size to fit through said end opening in said tool shank;

an annular clearance groove formed around said shaft, axially spaced from said free shaft end;

a radially-compressible spring ring located within said clearance groove, said spring ring having an outer peripheral surface which, when relatively uncompressed, is of greater size than said outer surface of said shaft and sized to be received into said retention groove;

a first ramp at one at one side of said retaining groove for forcing said spring ring into an assembly-disassembly position on said shaft on application of a predetermined force urging relative movement between said shaft and said tool shank, and said shaft being closely fitted to said opening such that said tool shank may be slidably received in assembly with said shaft, through relative movement of said shank and shaft along said axes, whereby as said shank and shaft are relatively moved into assembly together, said shank is forced over said spring ring, said spring ring may compress into said clearance groove, and expand into said retention groove.

7. The improved tool storage module of claim 6, further comprising a second ramp on said free shank end around said end opening.

8. The improved tool storage module of claim 7, wherein said shaft supports said tool shank at axially spaced portions of said opening and said cavity when said tool shank is slidably received in assembly with said shaft.

9. A tool storage system according to claim 7, wherein said storage module base includes a shroud portion substantially covering said outer shank surface when said shank is received in assembly with said shaft.

10. The improved tool storage module of claim 7, further including shoulder means for limiting an assembled axial position of said shank relative to said shaft.

11. A tool storage system according to claim 7, wherein a portion of said cavity is closely fitted to said shaft outer surface.

12. A tool storage system according to claim 7, wherein said shaft outer surface has a generally circular cross-section.

13. A tool storage system according to claim 7, wherein said spring ring is substantially a circular ring, formed of spring wire.

* * * * *